(12) United States Patent
Buissette et al.

(10) Patent No.: US 9,982,191 B2
(45) Date of Patent: May 29, 2018

(54) SUSPENSIONS OF PHOSPHATES OF AT LEAST ONE RARE EARTH ELEMENT SELECTED FROM AMONG CERIUM AND TERBIUM AND OPTIONALLY LANTHANUM AND LUMINOPHORES PRODUCED THEREFROM

(75) Inventors: Valérie Buissette, Paris (FR); Thierry Le-Mercier, Rosny-sous-Bois (FR); Laurent Thiers, Savigny-sur-Orge (FR)

(73) Assignee: Rhodia Operations, Aubervilliers (FR)

( * ) Notice: Subject to any disclaimer, the term of this patent is extended or adjusted under 35 U.S.C. 154(b) by 951 days.

(21) Appl. No.: 12/992,465

(22) PCT Filed: May 13, 2009

(86) PCT No.: PCT/EP2009/055767
§ 371 (c)(1),
(2), (4) Date: Feb. 23, 2011

(87) PCT Pub. No.: WO2009/138426
PCT Pub. Date: Nov. 19, 2009

(65) Prior Publication Data
US 2011/0133124 A1    Jun. 9, 2011

(30) Foreign Application Priority Data

May 15, 2008   (FR) ..................................... 08 02628

(51) Int. Cl.
*C09K 11/77* (2006.01)
*C01B 25/45* (2006.01)
*H01J 61/44* (2006.01)

(52) U.S. Cl.
CPC .......... *C09K 11/7777* (2013.01); *C01B 25/45* (2013.01); *H01J 61/44* (2013.01)

(58) Field of Classification Search
CPC ............ C09K 11/7752; C09K 11/7723; C09K 11/7777
USPC ....................................... 252/301.4 R, 301.4 P
See application file for complete search history.

(56) References Cited

U.S. PATENT DOCUMENTS

| 5,289,081 | A | * | 2/1994 | Tamatani et al. ............. 313/487 |
| 5,314,641 | A | * | 5/1994 | Collin ................. C09K 11/7777 252/301.4 P |
| 5,340,556 | A | * | 8/1994 | Collin ................. C09K 11/7777 252/301.4 P |

(Continued)

FOREIGN PATENT DOCUMENTS

FR    2859922 A1    3/2005

OTHER PUBLICATIONS

Li et al., "Improved Luminescence of Lanthanide(III)-Doped Nanophosphors by Linear Aggregation", J. Phys. Chem. C., 2007, pp. 4111-4115, vol. 111.

(Continued)

*Primary Examiner* — Matthew E Hoban

(57) ABSTRACT

Phosphate particulates of at least one rare-earth metal (Ln), with Ln being at least one rare-earth metal selected from among cerium and terbium and optionally lanthanum are in the form of a suspension in a liquid phase of primary isotropic monocrystalline monazite particles having an average size of at least 25 nm and agglomerated into secondary particles having an average size of at most 400 nm; useful luminophores are produced from such phosphate particulates.

16 Claims, 1 Drawing Sheet

(56) References Cited

U.S. PATENT DOCUMENTS

| | | | | |
|---|---|---|---|---|
| 5,470,503 A * | 11/1995 | Braconnier | ............ | C01B 25/37 |
| | | | | 252/301.4 P |
| 5,724,800 A * | 3/1998 | Lucca | ...................... | D01H 5/72 |
| | | | | 57/200 |
| 5,746,944 A * | 5/1998 | Braconnier | ............ | C01B 25/45 |
| | | | | 252/301.4 P |
| 6,979,415 B1 | 12/2005 | Krishna et al. | | |
| 7,122,581 B1 * | 10/2006 | Braconnier | .......... | B01J 13/0013 |
| | | | | 106/14.12 |
| 7,569,613 B2 * | 8/2009 | Chane-Ching | ....... | B01J 13/0013 |
| | | | | 106/14.12 |
| 7,572,835 B2 * | 8/2009 | Chane-Ching | ....... | B01J 13/0013 |
| | | | | 106/14.12 |
| 2004/0044088 A1 | 3/2004 | Chane-Ching | | |
| 2007/0179203 A1 | 6/2007 | Chane-Ching et al. | | |

OTHER PUBLICATIONS

Ma et al., "Hydrothermal growth and morphology evolution of $CePO_4$ aggregates by a complexing method", Materials Research Bulletin, 2008, pp. 2840-2849, vol. 43.

Karpowich et al., "Synthesis and characterization of mixed-morphology $CePO_4$ nanoparticles", Journal of Solid State Chemistry, 2007, pp. 840-846, vol. 180.

International Search Report corresponding to PCT/EP 2009/055767.

* cited by examiner

SUSPENSIONS OF PHOSPHATES OF AT LEAST ONE RARE EARTH ELEMENT SELECTED FROM AMONG CERIUM AND TERBIUM AND OPTIONALLY LANTHANUM AND LUMINOPHORES PRODUCED THEREFROM

CROSS-REFERENCE TO PRIOR APPLICATIONS

This application claims priority under 35U.S.C. § 119 of FR 0802628, filed May 15, 2008, and is the U.S. National Stage of PCT/EP 2009/055767, filed May 13, 2009 and designating the United States (published in the French language on Nov. 19, 2009, as WO 2009/138426 A1; the title and abstract were also published in English), each hereby expressly incorporated by reference in its entirety and each assigned to the assignee hereof.

The present invention relates to a phosphate of at least one rare-earth metal chosen from cerium and terbium, optionally in combination with lanthanum, in the form of a suspension, to the process for preparing it and to its use as a luminophore.

The fields of luminescence and electronics are currently experiencing major developments. Examples of these developments that may be mentioned include the development of plasma systems (screens and lamps) for novel viewing and lighting or marking techniques. These novel applications require luminophore materials with further improved properties. Thus, besides their luminescence property, these materials are required to have specific morphology or granulometry characteristics in order especially to facilitate their use in the desired applications.

More specifically, it is sought to have luminophores that are in the form of particles that are as individualized as possible and of very fine, submicron size, especially less than 500 nm. Processes for preparing luminophores by grogging are known. However, to obtain the desired crystallographic phases, these processes require calcination at a high temperature, which generally has the consequence of giving products that are difficult to mill, and so it is impossible to achieve such a size.

Moreover, and still in the context of development in the fields of luminescence and electronics, it is sought to obtain transparent, luminescent materials in the form of films.

The main object of the invention is to provide products having such granulometric characteristics.

A second object of the invention is to obtain a luminescent material of the above type.

With this aim, the phosphate of the invention is a phosphate of a rare-earth metal (Ln), Ln representing at least one rare-earth metal chosen from cerium, terbium and lanthanum in combination with at least one of the first two abovementioned rare-earth metals, characterized in that it is in the form of a suspension in a liquid phase of isotropic, monocrystalline primary particles with a mean size of at least 25 nm, of the monazite type, aggregated into secondary particles, with a mean size of not more than 400 nm.

Other characteristics, details and advantages of the invention will emerge even more fully on reading the description that follows, and also the attached drawing, in which.

Figure 1:
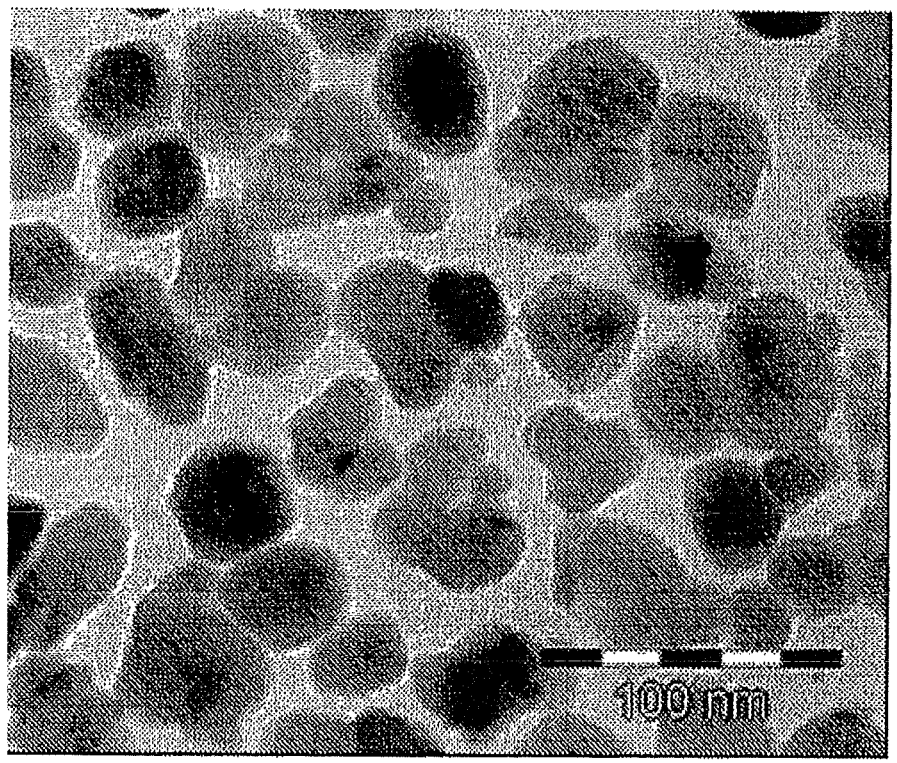
FIG. 1 is a TEM photograph of a phosphate according to the invention.

In the rest of the description, the term "rare-earth metal" means the elements from the group formed by scandium, yttrium and the elements of the Periodic Table with atomic numbers of between 57 and 71 inclusive.

It is also pointed out for the rest of the description that, unless otherwise mentioned, in the quoted ranges of values, the limit values are included.

The phosphate of the invention is a phosphate of cerium or terbium or alternatively of a combination of these two rare-earth metals. It may also be a phosphate of lanthanum in combination with at least one of these two abovementioned rare-earth metals and it may also most particularly be a phosphate of lanthanum, cerium and terbium.

According to particular embodiments, the proportions of these various rare-earth metals may vary within values that will be given below. Thus, the particles of the suspension of the invention (primary or secondary particles) essentially comprise a phosphate that may correspond to the general formula (1) below:

$$La_xCe_yTb_zPO_4 \qquad (1)$$

in which the sum $x+y+z$ is equal to 1 and at least one from among y and z is other than 0.

There may be a certain amount of residual phosphate present in the particles.

If at least one from among x and y is other than 0 in formula (1), preferably z is at most 0.5, and z may be between 0.05 and 0.2 and more particularly between 0.1 and 0.2.

x may be more particularly between 0.4 and 0.95.

The following more particular compositions may be mentioned, purely as examples:

$La_{0.44}Ce_{0.43}Tb_{0.13}PO_4$ $La_{0.57}Ce_{0.29}Tb_{0.14}PO_4$ $La_{0.56}Ce_{0.30}Tb_{0.14}PO_4$ $La_{0.94}Ce_{0.06}PO_4$ $Ce_{0.67}Tb_{0.33}PO_4$

According to one particular embodiment, the phosphate of formula (1) present in the particle may comprise other elements conventionally acting especially as promoter of the luminescence properties or as stabilizer of the oxidation states of the elements cerium and terbium. Examples of these elements that may be mentioned more particularly include alkali metals (in particular Li, Na and K), boron and other rare-earth metals such as scandium, yttrium, lutetium and gadolinium. When lanthanum is present, the abovementioned rare-earth metals may be more particularly present in replacement for this element. These promoting or stabilizing elements are present in an amount generally of not more than 1% by mass of element relative to the total mass of the phosphate of formula (1) in the case of the alkali metals and of boron and generally of not more than 30% for the other elements mentioned above.

Moreover, the phosphate according to the invention has very low cerium IV and/or terbium IV concentrations, even after calcination at a high temperature in air.

This low proportion of these two species may be demonstrated by a colorimetry test that consists in determining the characteristic color coordinates of the body in the CIE 1976 system (L*, a*, b*) as defined by the International Commission on Illumination, and listed in the Recueil de Normes Françaises [French Standards Collection] (AFNOR) colorimetric color No. X08-012 (1983). These coordinates are determined using a colorimeter sold by the company Pacific Scientific.

Thus, the phosphate of the invention, in powder form after separation from the liquid phase of the suspension, has after calcination at 700° C. in air a lightness, represented by the coordinate L*, of greater than 98% and advantageously of at least 99%.

This coordinate L* allows measurement of the white color of the product, which is itself directly related to the presence of colored species in the product such as cerium and/or terbium in oxidation state 4+.

The phosphate of the invention is in the form of a suspension of particles known as "secondary particles". These particles are aggregates of other finer aggregated particles, which are referred to in the present description as "primary particles".

These secondary particles have a mean size ($d_{50}$) of not more than 400 nm, more particularly not more than 300 nm and even more particularly not more than 200 nm. Generally, their mean size is at least 50 nm and more particularly at least 100 nm.

Moreover, these particles may have a narrow particle size dispersion; more specifically, their dispersion index may be not more than 1, preferably not more than 0.7 and even more preferentially not more than 0.5.

Throughout the description, the mean size and the dispersion index given for the second particles are the values obtained by using the laser scattering technique using a laser granulometer (volume distribution).

The term "dispersion index" means the ratio:

$$\sigma/m = (d_{84} - d_{16})/2d_{50}$$

in which:
$d_{84}$ is the particle diameter for which 84% of the particles have a diameter less than $d_{84}$;
$d_{16}$ is the particle diameter for which 16% of the particles have a diameter less than $d_{16}$;
$d_{50}$ is the mean diameter of the particles.

It is pointed out herein that the mean size measurements are performed on suspensions that have not undergone decantation, i.e. that have no supernatant phase and no decantation sediment, and which, if necessary, have been treated by means of an ultrasonication probe according to the well-known methods used for measurements of this type.

The primary particles that constitute the secondary particles have morphology, phase and size characteristics that will now be described more precisely.

The primary particles are substantially in the form of a rare-earth metal orthophosphate of crystalline monazite structure. Analysis by X-ray diffraction (XRD) of the phosphate of the invention does not reveal the presence of extraneous phases of $CeO_2$ or $Tb_4O_7$ type, for example, which moreover confirms the presence of cerium and/or terbium only in oxidation state 3+.

The primary particles are monocrystalline.

The monocrystalline aspect of the particles may be revealed by comparing the mean particle size measured by the TEM technique (Transmission Electron Microscopy) with the coherent domain value obtained from the XRD analysis. It is pointed out herein that the value measured in XRD corresponds to the size of the coherent domain calculated from the width of the diffraction line corresponding to the crystallographic plane (200). The Scherrer model, as described in the book Théorie et technique de la radiocristallographie, A. Guinier, Dunod, Paris, 1956, is used for this measurement. The two values: mean size determined by TEM ($t_1$) and mean size determined by XRD ($t_2$) give, for the primary particles, the same order of magnitude, i.e., in the sense of the present description, they are in a ratio $t_1/t_2$ of not more than 2 and more particularly of not more than 1.5.

These particles are also isotropic or substantially isotropic as regards their morphology. Specifically, their form resembles that of a sphere (totally isotropic morphology), as opposed to particles of needle or platelet form.

More specifically, the particles may have a ratio L/l of not more than 2 and more particularly of not more than 1.5, L denoting the longest length of the particle and l denoting the smallest. The values of L and l are determined by TEM analysis.

As indicated above, the primary particles have a mean size of at least 25 nm and more particularly of at least 30 nm. This size may be between 25 nm and 200 nm and more particularly between 30 nm and 150 nm.

For the primary particles, the size values given here and throughout the description are values obtained via the TEM or XRD analysis technique.

The phosphate of the invention is generally in the form of a suspension in a liquid phase of the particles that have just been described. This suspension may sediment over time and this sedimentation may lead to aggregation of the particles with each other. However, and this is an important property of the suspension of the invention, simple stirring using very low mechanical energy, especially ultrasonication treatment, for example with a power of 120 W for 3 minutes, allows these particles to be deaggregated and thus to return to a suspension whose particles have all the characteristics given above.

The liquid phase of the suspensions according to the invention may be water or a water/water-miscible solvent mixture or alternatively an organic solvent.

The organic solvent may most particularly be a water-miscible solvent. Examples that may be mentioned include alcohols, for instance methanol or ethanol, glycols, for instance ethylene glycol, acetate derivatives of glycols, for instance ethylene glycol monoacetate, glycol ethers, polyols and ketones.

This liquid phase may also comprise a dispersant.

This dispersant may be chosen from the known dispersants, for example from polyphosphates ($M_{n+2}P_nO_{3n+1}$) or metaphosphates ($[MPO_3]_n$) of alkali metals (M denoting an alkali metal such as sodium), especially such as sodium hexametaphosphate. It may also be chosen from alkali metal silicates (sodium silicate), amino alcohols, phosphonates, citric acid and salts thereof, phosphosuccinic acid derivatives (($HOOC)_n$—R—$PO_3H_2$ in which R is an alkyl chain), polyacrylic, polymethacrylic or polystyrenesulfonic acids, and salts thereof. Citric acid and metaphosphates are most particularly preferred.

The amount of dispersant may be between 1% and 15% and more particularly between 4% and 8%, this amount being expressed as mass of dispersant relative to the mass of solid in the dispersion.

The phosphate concentration of the suspension may vary within a wide range. By way of example, it may be between about 10 g/l and about 500 g/l and more particularly between 40 g/l and 300 g/l.

For suspensions in aqueous phase, and according to one particular variant, an interesting characteristic of these is their stability over a wide pH range. Thus, these suspensions remain stable, i.e. they do not give rise to sedimentation or aggregation of the particles when their pH is made to vary within given ranges of values, these ranges as a whole globally covering pH values that may be between 2 and 11 and more particularly between 4 and 10. Such pH variations may take place in the use of the suspensions in luminescence applications, and this characteristic is consequently important since the suspensions may thus be used in a wide range of applications.

The invention also relates to a phosphate that is in solid form, i.e. in the form of a powder which has the characteristic of being able to give the phosphate in suspension form described above. In other words, when this powder is redispersed in a liquid phase, after simple stirring, without it being necessary to apply substantial mechanical energy, especially, in this case also, by simple ultrasonication treatment, for example with a power of about 450 W, a suspension of the phosphate having the characteristics given above is obtained. Needless to say, everything that has been described previously regarding the nature and composition of the phosphate: nature of the crystallographic phase, nature and amount of the rare-earth metal, applies identically for the phosphate in solid form.

The process for preparing the phosphate of the invention in suspension form will now be described.

This process is characterized in that it comprises the following steps:
- a first solution containing soluble salts of the rare-earth metals (La, Ce, Tb) is introduced continuously into a second solution containing phosphate ions and having an initial pH of less than 2;
- the pH of the medium thus obtained is regulated during the introduction of the first solution into the second at a constant value of less than 2, via which a precipitate is obtained;
- the precipitate thus obtained is recovered and calcined at a temperature of at least 600° C.;
- wet milling of the product obtained from calcination is performed.

The first step of this process consists in continuously introducing with stirring a first solution of salts of the rare-earth metals included in the composition of the phosphate that it is desired to prepare, into a second solution containing phosphate ions and having an initial pH of less than 2; the pH of the medium thus formed during the placing of these two solutions in contact is also regulated to a constant value of less than 2. The salts of the rare-earth metals that are suitable for use are especially salts that are soluble in aqueous medium, for instance nitrates, chlorides, acetates, carboxylates or a mixture thereof.

The phosphate ions intended to react with the solution of the rare-earth metal salts may be provided by pure compounds or compounds in solution, for instance phosphoric acid, phosphates of alkali metals or of other metal elements that give with the anions associated with the rare-earth metals a soluble compound. The phosphate ions are preferably added in the form of a solution of an ammonium phosphate, which may more particularly be diammonium or monoammonium phosphate.

Preferably, the solution containing the phosphate ions initially has (i.e. before the start of introduction of the solution of rare-earth metal salts) a pH of less than 2 and preferably between 1 and 2. Thus, if the solution used does not naturally have such a pH, the pH is brought to the desired suitable value either by adding a base (for example aqueous ammonia in the case of a phosphoric acid initial solution) or by adding an acid (for example nitric acid, in the case of a diammonium phosphate initial solution).

The phosphate ions are present in an amount such that the reaction medium has a $PO_4^{3-}$/rare-earth metal ratio of greater than 1 and advantageously between 1.1 and 3.

The term "regulating the pH" means maintaining the pH of the medium at a certain constant or substantially constant value, by adding basic compounds or buffer solutions to the medium. The pH of the medium will thus vary by not more than 0.5 pH unit around the set nominal value, and more preferably by not more than 0.1 pH unit around this value.

Thereafter, during the introduction of the solution containing the rare-earth metal salts, the pH of the medium obtained gradually decreases; thus, to maintain the pH of this medium at the desired constant working value, which must be less than 2 and preferably between 1 and 2, a basic compound is simultaneously introduced into this medium.

Examples of suitable basic compounds that may be mentioned include metal hydroxides (NaOH, LiOH, KOH, $Ca(OH)_2$, etc.) or ammonium hydroxide, or any other basic compound whose constituent species will not form any precipitate during their addition to the reaction medium, by combination with one of the species contained elsewhere in this medium, and allowing regulation of the pH of the precipitation medium. A preferred basic compound of the invention is ammonia, advantageously used in the form of an aqueous solution.

The mixing of the solution of the rare-earth metal salt and of the phosphate ions produces a precipitate.

This precipitation is preferably performed in aqueous medium at a temperature that is not critical and that is advantageously between room temperature (15° C.-25° C.) and 100° C. This precipitation takes place with stirring of the reaction medium.

After the precipitation, it is optionally possible to perform maturation by maintaining the reaction medium obtained previously at a temperature within the same temperature range as that at which the precipitation took place and for a time that may be between fifteen minutes and one hour, for example.

The precipitate obtained may be separated from the reaction medium via any suitable means, especially by filtration. It may be washed, for example with water, to remove any impurities.

The following step of the process consists in calcining the precipitate obtained.

This calcination is performed at a temperature of at least 600° C., which may more particularly be between 600° C. and 1000° C. This calcination is performed in air or in a reductive atmosphere, for example in hydrogen as a mixture with nitrogen or argon. The duration of this calcination is, for example, about 2 hours.

This calcination may be performed with or without flux. Suitable fluxes that may especially be mentioned include lithium, aluminum or magnesium fluoride, lithium, aluminum or magnesium chloride, potassium chloride, ammonium chloride and boron oxide, this list obviously being in no way limiting. The flux is mixed with the product and the mixture is then brought to the chosen temperature.

The final step of the process consists in milling the product obtained from the calcination.

Wet milling is performed in water or in a water/solvent mixture or in an organic solvent of the same type as the solvents that have been described above for the constituent liquid phase of the suspension.

A dispersant of the type described above and in the amounts given previously may be used during the milling. This dispersant may contribute to the stability of the suspension obtained in various pH ranges as described above, a given dispersant leading to stability over a given pH range.

After the wet milling, the phosphate of the invention is obtained in the form of a suspension.

It will be noted that, in the case of a suspension in a water/solvent mixture or in an organic solvent, this suspension may be prepared from an aqueous suspension as obtained via the process that has just been described and by adding the organic solvent to this aqueous suspension, followed, if necessary, by distillation to remove the water.

The description that has just been given concerns the preparation of phosphate in the form of a suspension. To obtain the phosphate of the invention in the form of a powder, this suspension is used to begin with and the solid product is separated from the liquid phase by using any known separation technique, for example by filtration. The solid product thus obtained may be optionally dried and then resuspended in a liquid phase of the same type as that described above.

By virtue of their properties, the phosphates of the invention, which means the phosphates in the form of a suspension or the phosphates in solid form, may be used as luminophores. These phosphates have luminescence properties under electromagnetic excitation in the wavelength range used in plasma systems (screens and lamps in which the excitation is created by a rare gas or a mixture of rare gases such as xenon and/or neon) and in mercury vapor lamps in the case of phosphates doped with cerium and terbium in combination. As a result, they may be used as luminophores in plasma systems (display screens or lighting systems) or in mercury vapor lamps.

The invention thus relates also to luminescent devices comprising the phosphate described above or as obtained via the process described above or devices manufactured using this same phosphate. Similarly, the invention relates to plasma systems or mercury vapor lamps, in the manufacture of which the phosphate may be included, or comprising this same phosphate. The use of luminophores in these manufactures is performed according to well-known techniques, for example by screen printing, electrophoresis, sedimentation, inkjet printing, spraying, spin-coating or dip-coating.

The granulometric properties of the phosphates of the invention are such that they may be used as markers in semitransparent inks using up-conversion mechanisms in the IR-visible range or luminescence mechanisms in the IR range, for example for producing marking with an invisible barcode system.

The phosphates of the invention may also be used as markers in a material such as paper, cardboard, textile, glass or a macromolecular material. The latter material may be of diverse nature: elastomeric, thermoplastic, thermosetting.

The phosphates of the invention based especially on cerium and terbium may be used as a reflective barrier in mercury-vapor lighting systems.

The invention also relates to a luminescent material that comprises, or that may be manufactured using, at least one phosphate according to the invention or a phosphate obtained via the process as described above.

According to one preferential embodiment, this luminescent material may also be transparent. In this case, the phosphate included in its composition or in its manufacture is a phosphate according to the invention with a mean secondary particle size of between 100 nm and 200 nm and preferably between 100 nm and 150 nm.

It will be noted that this material may comprise, or may be manufactured using, besides the phosphate of the invention, other phosphates, or more generally other luminophores, in the form of submicron or nanometric particles.

This material may be in two forms, i.e. either in a bulk form, the material as a whole having transparency and luminescence properties, or in a composite form, i.e. in this case in the form of a substrate and of a layer on this substrate, only the layer then having these transparency and luminescence properties. In this case, the phosphate of the invention is contained in said layer.

The substrate of the material is a substrate that may be made of silicon, based on a silicone or made of quartz. It may also be a glass or alternatively a polymer such as polycarbonate. The substrate, for example the polymer, may be in a rigid form as a sheet or a plate a few millimeters thick. It may also be in the form of a film a few tens of microns or even a few microns to a few tenths of a millimeter thick.

For the purposes of the invention, the term "transparent material" means a material that has a haze of not more than 60% and a total transmission of at least 60%, and preferably a haze of not more than 40% and a total transmission of at least 80%. The total transmission corresponds to the total amount of light that passes through the layer, relative to the amount of incident light. The haze corresponds to the ratio of the diffuse transmission of the layer to its total transmission.

These two magnitudes are measured under the following conditions: the layer of material with a thickness of between 0.2 µm and 1 µm is deposited on a standard glass substrate 0.5 mm thick. The mass fraction of phosphate particles in the material is at least 20%. The total transmission and diffuse transmission measurements are performed through the layer of the material and of the substrate, by means of a standard procedure on a Perkin-Elmer Lambda 900 spectrometer equipped with an integration sphere, for a wavelength of 550 nm.

The material, and more particularly the above-mentioned layer, may comprise, besides a phosphate according to the invention, binders or fillers of the type such as polymers (polycarbonate, methacrylate), silicate, silica bead, phosphate, titanium oxide or other mineral fillers to improve especially the mechanical and optical properties of the material.

The mass fraction of phosphate particles in the material may be between 20% and 99%.

The thickness of the layer may be between 30 nm and 10 µm, preferably between 100 nm and 3 µm and even more preferentially between 100 nm and 1 µm.

The material, in its composite form, may be obtained by depositing a suspension of phosphate of the invention on to the substrate, which has optionally been prewashed, for example with a sulfo-chromic mixture. The binders or fillers mentioned above may also be added at the time of this deposition. This deposition may be performed via a spraying, spin-coating or dip-coating technique. After depositing the layer, the substrate is air-dried and may then optionally undergo a heat treatment. The heat treatment is performed by heating to a temperature generally of at least 200° C. and whose upper value is set especially taking into account the compatibility of the layer with the substrate so as especially to avoid spurious reactions. The drying and the heat treatment may be conducted in air, in an inert atmosphere, under vacuum or in hydrogen.

It has been seen hereinabove that the material may comprise binders or fillers. It is possible in this case to use suspensions that themselves comprise at least one of these binders or fillers, or alternatively precursors thereof.

The material in the bulk form may be obtained by incorporating phosphate particles into a matrix of polymer type, for instance polycarbonate or polymethacrylate, or a silicone.

Finally, the invention relates to a luminescent system that comprises a material of the type described above, and also an excitation source that may be a source of UV photons, for instance a UV diode, or alternatively an excitation of Hg, rare gas or X-ray type.

The system may be used as a transparent wall lighting device, of the lighting glazing type.

Examples will now be given. In these examples, the granulometry was determined according to the abovementioned laser scattering technique. It is also pointed out that the measurement was taken with a Coulter machine on suspensions diluted to a concentration of between 1 g/l and 10 g/l and which were treated beforehand with an ultrasonication probe (450 W probe) for 2 minutes 30 seconds.

EXAMPLE 1

This example concerns the preparation of a lanthanum cerium terbium phosphate of formula $La_{0.56}Ce_{0.3}Tb_{0.14}PO_4$, according to the invention.

A solution is made up by mixing lanthanum, cerium and terbium nitrates, of the following composition (in atom %):
La: 56%
Ce: 30%
Tb: 14%

The nitrate concentration of the solution is 350 g/l.

This solution is added to a phosphoric acid solution at 60° C., the pH of which is regulated at 1.6 by adding aqueous ammonia. The phosphate/rare-earth metal mole ratio is 1.15. The pH during the precipitation is regulated so as to remain constant, by adding aqueous ammonia.

After precipitation, the reaction medium is maintained at 60° C. for 15 minutes. The precipitate is then recovered by filtration, washed with water and then air-dried and calcined at 850° C.

The powder thus obtained has a LaCeTb phosphate structure, of monazite type. It is subjected to wet milling in a bowl mill with Molinex beads, with 0.4-0.6 mm $ZrO_2$—$SiO_2$ beads. The degree of occupancy of the beads in the milling chamber is 65%. The solids concentration of the suspension is 50% by mass, and a dispersant, sodium hexametaphosphate (HMP), is added in a proportion of 0.1 g HMP/g powder (i.e. 10% by mass). The spin speed of the spindle is 1000 rpm. The milling lasts 150 minutes.

Following this wet milling, a second milling is performed on the suspension with 0.2-0.3 mm $ZrO_2$—$SiO_2$ beads. The other milling parameters are unchanged, and the milling time is 60 minutes.

Analysis by laser granulometry, without ultra-sonication, gives the following results:

| | |
|---|---|
| $d_{16}$ (nm) | 90 |
| $d_{50}$ (nm) | 126 |
| $d_{84}$ (nm) | 180 |
| σ/m | 0.4 |

The analysis of the sample thus obtained by X-ray diffraction reveals a lanthanum cerium terbium phosphate monazite phase, with a coherent domain size calculated from the width of the diffraction line corresponding to the crystallographic plane (200) of 35 nm.

The attached FIG. 1 is a TEM photograph of the suspension obtained from the milling. This photograph shows the monocrystalline and isotropic nature of the particles. Specifically, the measured mean particle size is 40 nm, which gives a TEM mean size/XRD mean size ratio of 1.15.

Figure 2:
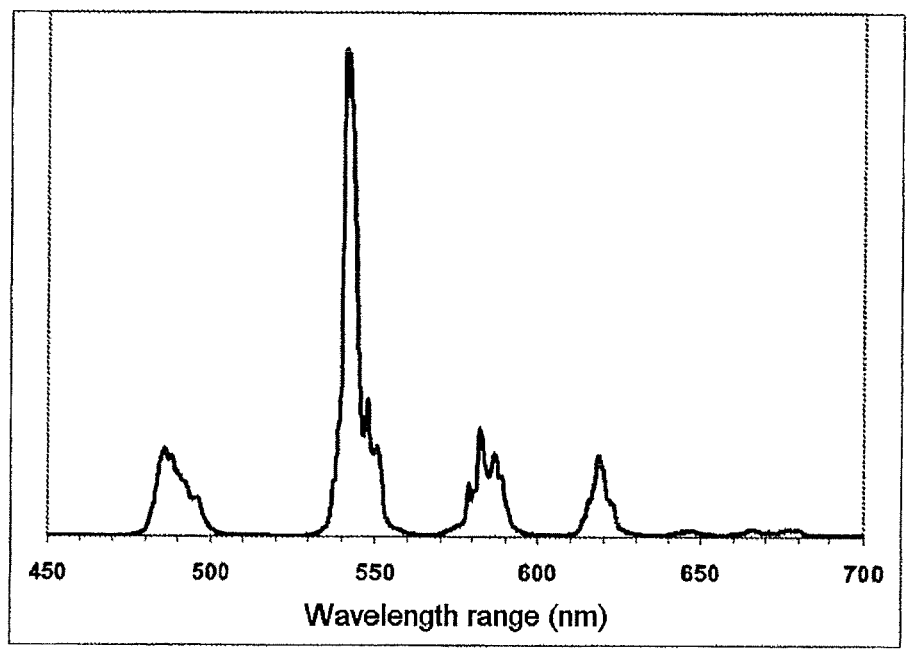
FIG. 2 is an emission spectrum of this phosphate.

FIG. 2 is an emission spectrum of this same suspension under excitation at 254 nm, which shows the emission of the $Tb^{3+}$ ions corresponding to 4f-4f transitions.

A colorimetric test on the powder obtained after drying the suspension allows measurement of the L* coordinate. The L* value obtained is 98.6%. This value, greater than 98%, makes it possible to conclude that there are no colored species in the product such as cerium and/or terbium in oxidation state $4^+$.

EXAMPLE 2

This example also concerns the preparation of a lanthanum cerium terbium phosphate according to the invention, in powder form.

The synthesis is identical to that of Example 1, and the slurry obtained from the wet milling is then dried for 12 hours in an oven at 110° C.

The dry product in powder form thus obtained is resuspended in water to give a suspension.

The analysis by laser granulometry of this suspension, after subjecting it to ultrasonication at a power of 450 W, gives the following results:

| | |
|---|---|
| $d_{16}$ (nm) | 80 |
| $d_{50}$ (nm) | 120 |
| $d_{84}$ (nm) | 190 |
| σ/m | 0.5 |

The invention claimed is:

1. A liquid phase suspension of secondary particles of a phosphate of a rare-earth metal (Ln), wherein Ln is at least one rare-earth metal selected from cerium, terbium and optionally lanthanum, said suspension in a liquid phase comprising isotropic, monocrystalline primary monazite particles having a mean size of at least 25 nm, aggregated into said secondary particles having a mean size of not more than 400 nm and an L/I ratio of not more than 2, and L denotes the longest length of the particle and I denotes the smallest length of the particle.

2. The phosphate suspension as defined by claim 1, wherein the secondary particles have a dispersion index of not more than 0.7.

3. The phosphate suspension as defined by claim 1, wherein the particles comprise a phosphate having the general formula (1) below:

$$La_xCe_yTb_zPO_4 \qquad (1),$$

wherein the sum x+y+z is equal to 1 and at least one of y and z is other than 0, with x optionally ranging from 0.4 to 0.95.

4. The phosphate suspension as defined by claim 3, wherein the particles comprise a phosphate of the formula (1) in which at least one of x and y is other than 0 and z is not more than 0.5.

5. The phosphate suspension as defined by claim 1, wherein the secondary particles have a mean size of not more than 300 nm.

6. The phosphate suspension as defined by claim 4, wherein z ranges from 0.05 to 0.2.

7. The phosphate suspension as defined by claim 5, wherein the secondary particles have a mean size of not more than 200 nm.

8. A process for preparing a phosphate suspension as defined by claim 1, comprising the following steps:

continuously introducing a first solution containing soluble salts of the rare-earth metals (La, Ce, Tb) into a second solution containing phosphate ions and having an initial pH of less than 2;

regulating the pH of the medium thus obtained during the introduction of the first solution into the second at a constant value of less than 2, via which a precipitate is obtained;

recovering and calcining the precipitate thus obtained at a temperature of at least 600° C.; and wet milling the product obtained after calcination.

9. The process as defined by claim 8, wherein the regulation of the pH of the precipitation medium is carried out by adding a basic compound.

10. A luminescent device comprising a phosphate as defined by claim 1.

11. A plasma system comprising a phosphate suspension as defined by claim 1.

12. A mercury vapor lamp comprising a phosphate suspension as defined by claim 1.

13. A luminescent material comprising a phosphate suspension as defined by claim 1.

14. The luminescent material as defined by claim 13, being transparent and the phosphate particles having a mean secondary particle size of from 100 nm to 200 nm.

15. A luminescent system comprising the luminescent material as defined by claim 13 and also an excitation source.

16. A luminophore comprising the phosphate suspension as defined by claimed 1.

* * * * *